United States Patent [19]

Lakatos

[11] 4,100,830
[45] Jul. 18, 1978

[54] SHEET CAKE CUTTER

[75] Inventor: Charles Lakatos, San Francisco, Calif.

[73] Assignee: Fantasia Confections, Inc., South San Francisco, Calif.

[21] Appl. No.: 830,195

[22] Filed: Sep. 2, 1977

[51] Int. Cl.² .................. B26D 4/04; B26D 4/16; B26D 3/22

[52] U.S. Cl. .................. 83/371; 83/372; 83/339; 83/425.3; 83/426; 83/491; 83/579

[58] Field of Search ............ 83/290, 295, 298, 332, 83/335, 339, 371, 372, 404.1, 425, 425.2, 425.4, 420, 424, 426, 430, 491, 579, 917

[56] References Cited

U.S. PATENT DOCUMENTS

| 1,973,526 | 9/1934 | Diamond et al. | 83/420 X |
| 3,211,066 | 10/1965 | Palamenti | 83/332 X |

*Primary Examiner*—Willie G. Abercrombie
*Attorney, Agent, or Firm*—Lothrop & West

[57] ABSTRACT

A sheet cake cutter is effective to cut a sheet cake disposed in a pan having a surrounding rim. The cutter has a frame supporting a conveyor belt for horizontal advancement and on which the sheet cake pan is concurrently advanced. On a transverse shaft mounted for rotation on the frame are preferably arranged at least a pair of cutter discs having edge notches therein. The cutter discs are disposed in registry with a predetermined space between them. The discs are set just to touch the bottom of the pan and with the edge notches spaced to interengage the rim. The cutter discs can be frictionally driven or shaft driven though a single-cycle clutch from the conveyor drive. The clutch is manually or automatically actuated to engage the drive by a pan on the conveyor and in position for interengagement of the notches and the pan rim. There is a hold-down roller disposed in the space between cutter discs and set at a height just above the sheet cake in the pan.

8 Claims, 3 Drawing Figures

SHEET CAKE CUTTER

BRIEF SUMMARY OF THE INVENTION

In the large-scale manufacture of petits fours and like confections, it is customary to start with a large sheet cake; that is, a single layer of cake dough generally baked in a rectangular pan within the confines of a rim extending around the pan edge. The large sheet cake is manually cut into a number of individual blocks, often squares, that subsequently are individually removed from the pan and are then decorated and otherwise finished. Manual cutting of the sheet cake into the individual portions is not only laborious but does not always result in even sections nor in sharply defined edges. There is consequently provided a machine into which the customary sheet cake in its regulation pan can be introduced and conveyed along a predetermined path. As it advances, the sheet cake is cut into a number of longitudinal strips by automatically working cutting discs, taking into account the edges or rims of the pan and effective to provide quite uniform cutting of the cake. After an initial traverse through the machine, the cake pan is reintroduced but at right angles to its first orientation so that the already-cut strips are again cut at right angles to the initial cuts resulting in the desired rectangular or square finished pieces. Cutter discs are provided at predetermined spaces apart, and rollers between them serve to hold down the cake between the cutters. The cutter discs have edge notches interrelated to the rim on the pan to clear the pan rim. Sometimes the cutters are positively driven in synchronism with the advancement of the conveyor and usually through the medium of a single-cycle clutch, which is automatically actuated when the pan advances and is automatically stopped at the end of a cycle, ready for a subsequent operation.

DETAILED DESCRIPTION

Figure 1:
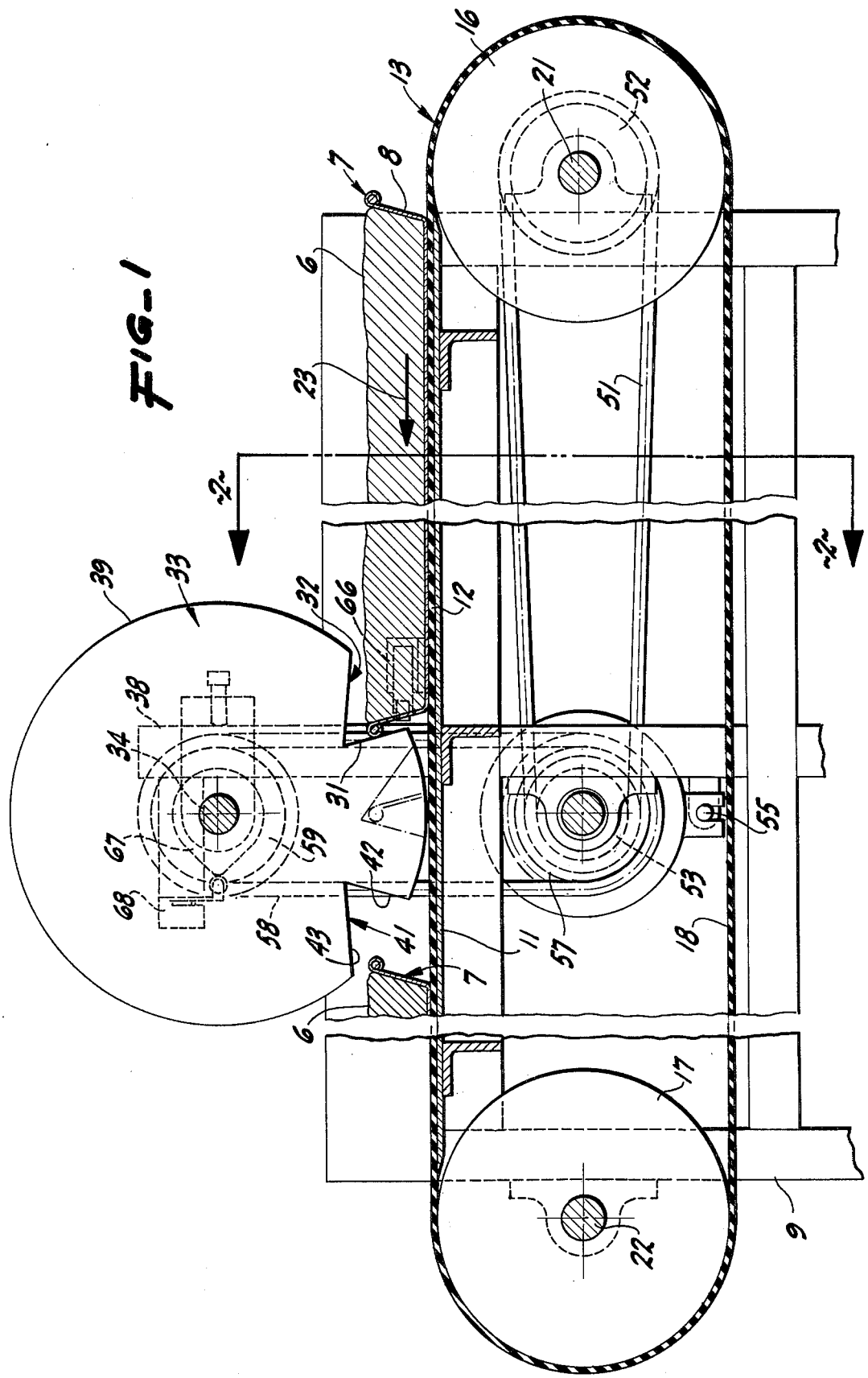
FIG. 1 is a side elevation of a device pursuant to the invention, certain portions being shown in section on a vertical longitudinal plane.

For the handling of a sheet cake 6 contained in a pan 7 having upstanding edges 8 therearound, there is preferably provided a frame 9 on which is mounted a platen 11. Just over the platen extends the upper run 12 of a conveyor belt 13. The belt extends around rollers 16 and 17, at the opposite ends of the machine, and has a return run 18. The individual rollers are mounted respectively on shafts 21 and 22, the former of which is preferably driven by a motor or comparable driving device, not shown, but effective to advance the upper run 12 in the direction of the arrow 23.

In one method of operating the device when the shaft 21 is propelled and the conveyor upper run is advanced, the tray 7 is positioned thereon with the sheet cake 6 therein. The cake advances in the direction of the arrow 23 until such time as the leading edge or rim 8 of the pan comes into contact with the bounding edge 31 of a notch 32 formed in the edge of a cutting disc 33. A series of cutting discs 33 are arranged alongside each other on a shaft 34, each disc being spaced a predetermined distance apart from the adjacent disc in order to leave an intervening space 36. The shaft 34 is mounted on uprights 37 and 38 upstanding from the frame 9. The discs are united to turn in unison with the shaft 34 and customarily are arranged or registered as shown in FIG. 1.

In advancing, the leading rim of the pan comes into contact with the edge of the notch 32 which "gears" with or turns over and clears the rim as the pan advances. The pan edge causes rotation of the disc 33, and the radius of the disc is preferably such that the disc edge 39 is in light frictional contact with the bottom of the pan 7 as the disc cuts through the sheet cake therein. Some rotation is caused by frictional contact with the bottom of the pan. As the discs turn, the sheet cake is divided by a number of longitudinally extending cuts into individual, elongated pieces. The dimensions are such that as the trailing rim 8 of the pan approaches the disc, another notch 41 in the disc edge bounded by sides 42 and 43 substantially registers or "gears" with the trailing edge of the pan and permits the pan to pass without undue mechanical interference. Since the advancing pan is then free of the disc, the disc stops its rotation, substantially as shown in FIG. 1, again in position for engagement with a subsequently advancing pan. In this way the sheet cake is automatically divided into a number of longitudinal sections.

Following this, the sheet cake is removed with its pan from the upper run 12 of the conveyor and is reintroduced into the machine after a ninety degree rotation. Again the sheet cake advances on the upper run of the conveyor. This time the same cutting action takes place by all of the discs except that the cuts are at right angles to and intersect the previously made cuts. The sheet cake is thus divided into a number of rectangles or, preferably, squares. The cutting job is thus completed. Alternatively, the pan, after turning, can be run through a subsequent, similar cutter with the same or different cutter spacing and number, thus taking care of shapes other than square.

Under some circumstances, it is desired to augment the rather simple mechanism just described by a power drive for the cutter discs.

Figure 2:
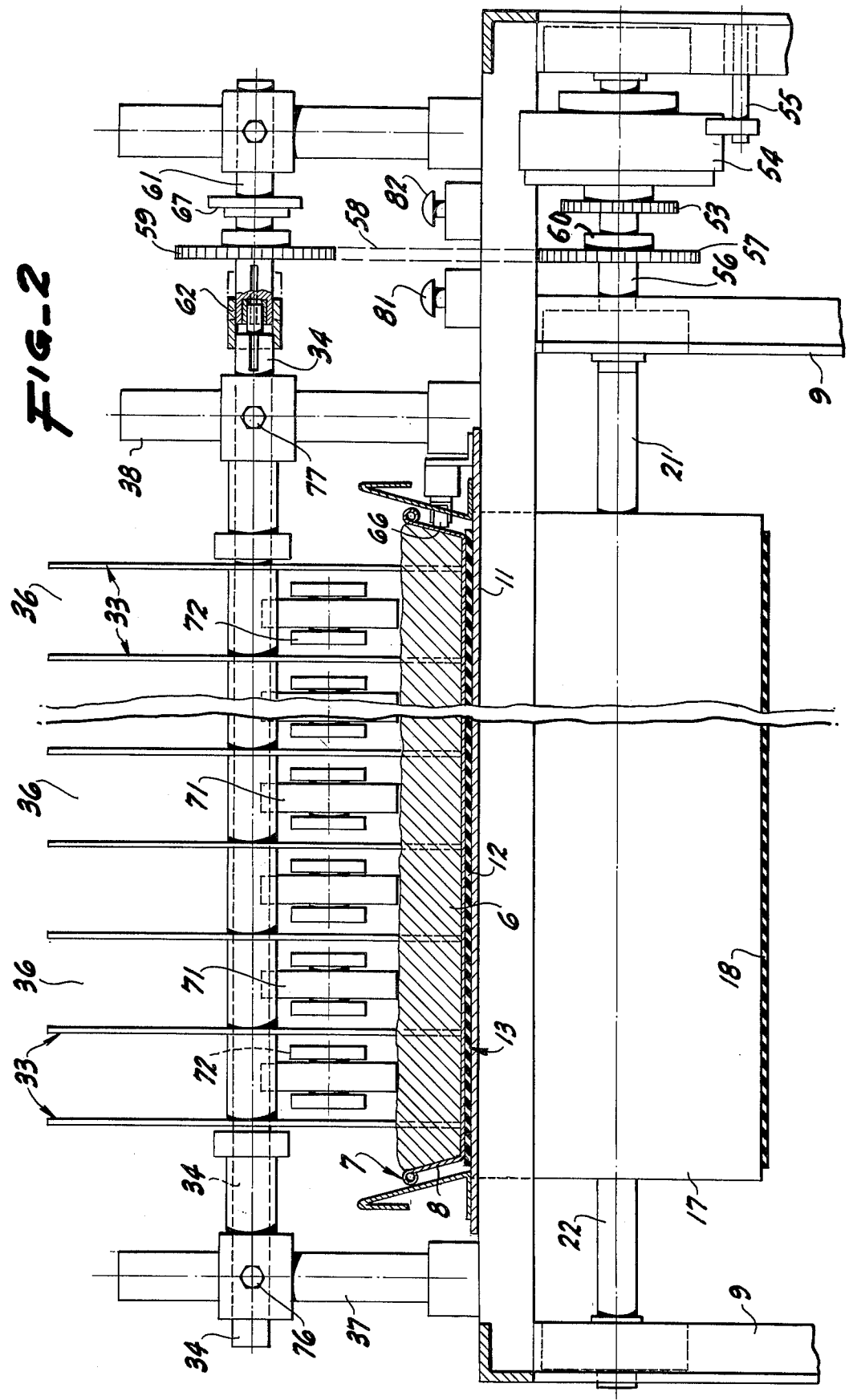
FIG. 2 is a cross-section, the plane of which is indicated by the line 2—2 of FIG. 1.
Figure 3:
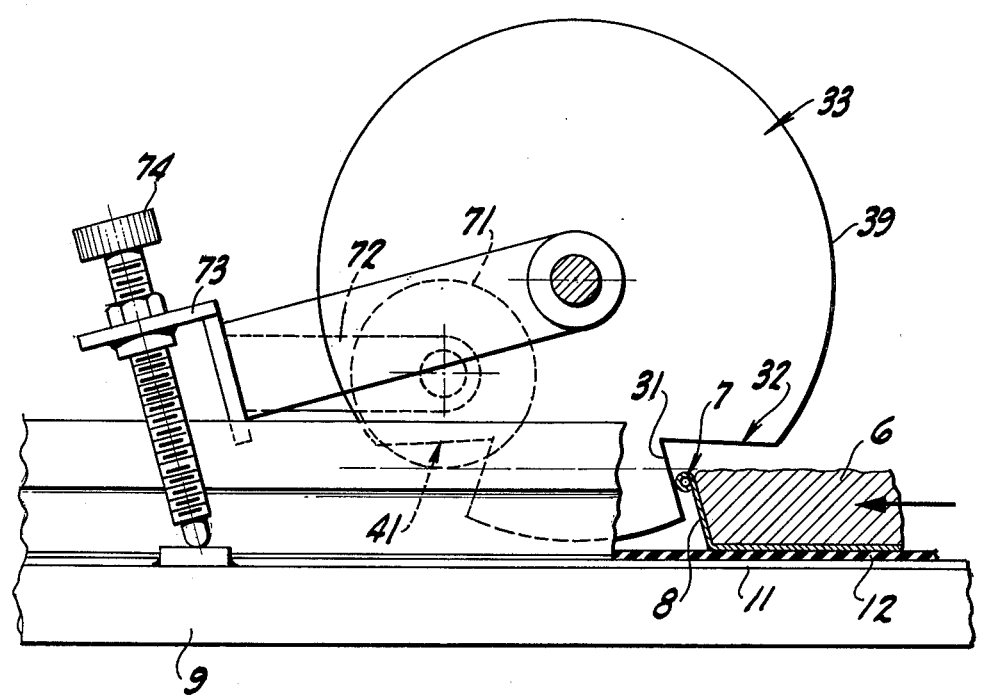
FIG. 3 is a detail view showing the arrangement of a roller between successive cutting discs.

A drive chain 51 extends from a sprocket 52 on the drive shaft 21 and engages a clutch sprocket 53 forming part of a standard unicycle or single-cycle clutch 54, anchored on the frame through a torque arm 55. The output from the clutch is through a shaft 56. A reversing gear 60 connects the shaft 56 to a sprocket 57 in engagement with a chain 58. Likewise engaging the chain is a sprocket 59 on an auxiliary shaft 61 journalled on the frame. A slotted collar 62 is keyed on the shaft 61 and in one position meshes with the end of the shaft 34. When the collar is in the position shown in FIG. 2, the shafts 61 and 34 are united for concurrent rotation but when the collar 62 is moved to the right in FIG. 2 it is disengaged from the shaft 34. There is then no connection between the shaft 61 and the shaft 34.

In the operation of this power arrangement, the pan 7 containing an uncut sheet cake is placed on the conveyor 13, as before, and advances in the direction of the arrow 23 until such time as the leading edge of the pan abuts a switch contact 66. This switch when closed is effective to energize the clutch 54 for one cycle of rotation. The effect is to connect the driving shaft 21 to the driven shaft 56 and so to the shaft 34. The locations are such that the switch 66 is closed just as the advancing edge of the pan comes adjacent the first notch 32. The cutter discs 33 then rotate in unison as the pan advances, much as previously described, except that the discs are independently rotated without contact with the pan edge.

As the pan advances and the cutting action takes place, the cutting discs 33 rotate one cycle. That the discs do not rotate more than that is insured by the operation of a cam 67 fast on the shaft 34. In the proper orientation of the cutting discs, the cam 67 comes into contact with and energizes a clutch switch 68 effective to deenergize the clutch 54 at the end of one complete cycle. Thus, as the pan moves beneath the cutting discs and its trailing edge passes through the notch 41, the clutch 54 is again disengaged, thus stopping the cutting disc operation.

Again, the pan can be removed, rotated ninety degrees and reintroduced. When the pan passes the switch 66 the cutting discs are reenergized so as to make cuts at right angles to the first cuts. The pan is discharged as before. If the pan is not square, it can, after turning, be sent through a similar, subsequent group of cutting discs properly set for the different pan dimension and for a different intercutter spacing, if desired.

To make sure that the cuts are well made even though at a relatively high speed, I particularly provide means in between the various cutter discs to insure that the severed cake squares or portions do not rise frictionally with the discs and get out of position. For that reason, in the intervening space 36 between each pair of discs, there is disposed a low-friction roller 71, preferably of Nylon, mounted on a bracket 72 for rotation about its own axis. The brackets are fastened to an angle frame 73 extending parallel to the shaft 34 and carrying adjusting screws 74 in engagement with the frame 9. By appropriate manipulation of the adjusting screws, the rollers 71 can be positioned with their lower edges just above the normal upper surface of the sheet cake 6. As the pan advances and as the cutters operate, any tendency of the sheet cake strips, squares, or blocks to rise is defeated by the presence of the intervening rollers 71.

After substantial use or at the end of a particular period of time, it is desirable to remove the cutter discs and wash them. This is readily accomplished by sliding the coupling 62 or collar to the right to free the shaft 34. Then, by releasing set screws 76 and 77 which support the shaft 34 on the uprights 37 and 38, the shaft 34 with its attached discs can then be lifted vertically above the uprights 37 and 38. After cleaning, the discs and shaft can be restored to a proper elevation with the set screws 76 and 77 being tightened to hold the discs in position.

Under some circumstances it is desirable to move the machinery without depending upon the switch 66. For that reason, in circuit with the operational mechanism of the conveyor 13 and of the clutch, there is provided a manual start switch 81 and a manual stop switch 82. When the start switch is energized, the mechanism is put into operation and when the stop switch is energized or operated, the mechanism is stopped.

By these means there is provided a device for cutting a sheet cake automatically into a number of separate pieces with the pieces being uniformly and cleanly cut and being held in position while the cutting is taking place and for subsequent removal. A relatively standard cake pan is utilized; and the mechanism is simple, straightforward and readily maintained in a sanitary and operable condition.

I claim:

1. A sheet cake cutter comprising a frame, a conveyor on said frame adapted to advance on said frame a pan having a rim and containing a sheet cake, a cutter disc having therein an edge notch interengageable with said rim, and means on said frame for mounting said disc for rotation relative to said frame with said disc extending into said pan and said edge notch in interengagement with said rim.

2. A device as in claim 1 including means on said frame for driving said conveyor and for rotating said disc conjointly.

3. A device as in claim 2 including means for coupling to and uncoupling said means for rotating said disc from said means for driving said conveyor.

4. A device as in claim 3 in which said coupling and uncoupling means is a single-cycle clutch.

5. A device as in claim 4 including means actuated by a pan advancing on said conveyor for actuating said clutch.

6. A device as in claim 4 including means responsive to rotation of said disc for deactuating said clutch.

7. A device as in claim 1 including a shaft, a plurality of said cutter discs disposed coaxially on said shaft with a predetermined axial space therebetween, and a roller mounted on said frame and disposed in said space.

8. A device as in claim 7 including means for supporting said roller at a predetermined distance above said conveyor.

* * * * *